United States Patent [19]

Shiga et al.

[11] Patent Number: 5,559,979
[45] Date of Patent: Sep. 24, 1996

[54] TABLE-BASED INTER-SYSTEM SERIALIZATION CONTROL SYSTEM

[75] Inventors: Koichi Shiga; Yukiyoshi Yanase, both of Kawasaki, Japan

[73] Assignee: Fujitsu Limited, Kanagawa, Japan

[21] Appl. No.: 972,392

[22] Filed: Nov. 6, 1992

[30] Foreign Application Priority Data

Nov. 6, 1991 [JP] Japan ..................... 3-289031

[51] Int. Cl.⁶ .................................. G06F 15/16
[52] U.S. Cl. ................. 395/421.08; 395/421.06
[58] Field of Search .................. 395/400, 425, 395/650, 200; 319.5/416, 421.08, 421.06

[56] References Cited

U.S. PATENT DOCUMENTS

| | | | |
|---|---|---|---|
| 4,249,241 | 2/1981 | Aberle et al. | 395/500 |
| 4,408,273 | 10/1983 | Plow | 395/600 |
| 4,809,168 | 2/1989 | Hennessy et al. | 395/650 |
| 4,847,754 | 7/1989 | Obermarck et al. | 395/650 |
| 4,891,749 | 1/1990 | Hoffman et al. | 395/425 |
| 5,081,572 | 1/1992 | Arnold | 395/375 |
| 5,089,952 | 2/1992 | Bozman | 395/725 |
| 5,210,861 | 5/1993 | Shimoda | 395/575 |
| 5,212,788 | 5/1993 | Lomet et al. | 395/600 |
| 5,226,143 | 7/1993 | Baird et al. | 395/425 |
| 5,241,675 | 8/1993 | Sheth et al. | 395/600 |
| 5,253,344 | 10/1993 | Bostick et al. | 395/275 |
| 5,274,823 | 12/1993 | Brenner et al. | 395/725 |
| 5,287,521 | 2/1994 | Nitta et al. | 395/725 |
| 5,297,297 | 3/1994 | Inoue | 395/425 |
| 5,305,448 | 4/1994 | Insalaco et al. | 395/425 |
| 5,317,739 | 5/1994 | Elko et al. | 395/650 |
| 5,333,319 | 7/1994 | Silen | 395/650 |
| 5,339,427 | 8/1994 | Elko et al. | 395/725 |

OTHER PUBLICATIONS

C. Mohan, "ARIES/LHS: A Concurrency Control and Recovery Method Using Write–Ahead Logging for Linear Hashing with Separators," IEEE, 1993, pp. 243–252.

Perrizo, "Request Order Linked List (Roll): A Concurrency Control Object for Centralized and Distributed Database Systems" IEEE 1991, pp. 278–285.

*Primary Examiner*—David K. Moore
*Attorney, Agent, or Firm*—Nikaido, Marmelstein, Murray, Oram LLP

[57] ABSTRACT

An inter-system serialization control system comprising an external storage unit commonly connected to computer systems for storing, when a request for accessing a logical processing unit in the shared resources is generated from one of the computer systems, serialization management information corresponding to the logical processing unit. The logical processing unit is smaller than a volume of the shared resources. A serialization control unit is provided in each computer system, for reading, in response to a request for accessing a logical processing unit of the shared resources, the corresponding logical processing unit in the serialization management information from the external storage unit and for accessing the corresponding logical processing unit in the shared resources under serialization control based on the read serialization management information. Whereby the serialization control is effected with a logical processing unit smaller than a volume and without inter-communicating among the computer systems so that the overhead for each CPU is reduced.

12 Claims, 7 Drawing Sheets

TABLE-BASED INTER-SYSTEM SERIALIZATION CONTROL SYSTEM

BACKGROUND OF THE INVENTION

1. Field of the Invention

The present invention relates to an inter-system serialization control system for controlling a plurality of systems serially and exclusively for accessing shared resources.

A system in which a plurality of computers are connected via a communication channel is called a complex system. Each computer system in the complex system is hereinafter referred to as a cluster. Along with the development of computer systems to be used in various fields and the increasingly large scale of such systems for use, for example, as a computer system for a bank, complex systems have been recently used. In such a complex system, an operation of accessing shared resources in, for example, network data bases, relational data bases, general data sets, and so forth, commonly used among the clusters, must be controlled so that the clusters access the shared resources serially or exclusively. It has been desired to decrease the overhead in this serialization control.

2. Description of the Related Arts

As a conventional inter-cluster serialization control system for accessing shared resources, there are two known systems: one is a reserve-release system and the other is an inter-cluster communication system.

In the conventional reserve-release system, there is a problem in that reserving and releasing of resources are required each time an access request is made so that the serialization control has a large amount of overhead. In addition, since the logical processing unit used for serialization control in the conventional reserve-release system is a volume, with a volume being comprised of a plurality of magnetic disks for example, and the size of the volume is as large as, for example, several Gbytes, the unit used for serialization control is quite large so that there is a tendency for a queue to be easily generated among the clusters.

In a conventional inter-cluster communication system, there is a problem in that the communication overhead increases in proportion to an increase in the number of clusters in the complex system. The communication overhead is the time necessary for communication and the processing time required by a CPU in each cluster. In addition, the performance in processing a transaction cannot be greater than the performance of the communication channel.

SUMMARY OF THE INVENTION

Accordingly, an object of the present invention is to remove the above disadvantages of the conventional arts and to provide means which can reduce the overhead in a serialization control and which can realize an effective and high-speed serialization control.

To attain the above object, there is provided, according to the present invention, an inter-system serialization control system for serially allowing access to shared resources among a plurality of computer systems, comprising: an external storage unit commonly connected to the computer systems, for storing, when a request to access a logical processing unit in the shared resources is generated from one of the computer systems, serialization management information corresponding to the logical processing unit, the logical processing unit being smaller than a volume of the shared resources; and a serialization control unit provided in each of the computer systems and operatively connected to the external storage unit, for reading, in response to a request for accessing a logical processing unit of the shared resources, the corresponding logical processing unit in the serialization management information from the external storage unit and for accessing the corresponding logical process unit in the shared resources under serialization control based on the read serialization management information.

In the above system, it is preferable that the external storage unit comprises: a serialization table having a plurality of entries, the serialization information of a logical processing unit being stored in an empty entry of the plurality of entries when a request to access that logical processing unit in the shared resources is generated from one of the computer systems; and a serialization table link information storage unit for storing address information of the entries in the serialization tables and identification information for identifying logical processing units in the shared resources, the capacity of the serialization table link information storage unit being smaller than the capacity of the serialization tables; wherein the serialization control unit searches, in response to a request for exclusively accessing a logical processing unit in the shared resources, the entry in the serialization table in which the serialization information of the logical processing unit is stored, and judges whether or not the request for serially processing the logical processing unit conflicts with another serialization request, and when it is determined that the request for serially processing the logical processing unit does not conflict with another serialization request, the corresponding logical processing unit in the shared resources is accessed in accordance with the contents of the searched entry in the serialization table.

In the above system, it is further preferable, that the serialization table link information storage unit comprises a link table and serialization table hash, the link table having a plurality of entries each for storing an adress of an entry of the serialization table, and the serialization table hash having a plurality of entries each for storing an identification of a logical processing unit and an address of an entry in the link table.

Preferably, each entry in the serialization table stores an identifier of one of the computer systems, an identifier of a transaction, a serialization level, and an identifier of a logical processing unit.

Preferably, the external storage unit further comprises a schema list having a plurality of entries each for storing the name of a schema, the names of the resources, and the address of an entry of the serialization table hash.

Preferably, the logical processing unit is a block in the resources.

Alternatively, the logical processing unit may be a sub-range in the resources.

Also alternatively, the logical processing unit may be a range in the resources.

Also alternatively, the logical processing unit may be a schema in the resources.

Preferably, the external storage unit is a semiconductor memory.

Preferably the resources are data bases stored in direct access storage devices.

Alternatively, the resources are general data sets stored in direct access storage devices.

Preferably, the computer systems are connected via a communication bus for locking clusters and for releasisng the lock when a serialization process is effected.

According to the present invention, the unit for the serialization control is smaller than a volume. Therefore, the possibility of the generation of a queue is low. Further, the inter-communication for reserving or releasing serialization is not necessary in the present invention. Therefore, the communication overhead is reduced.

BRIEF DESCRIPTION OF THE DRAWINGS

The above object and features of the present invention will be more apparent from the following description of the preferred embodiment with reference to the drawings, wherein.

DESCRIPTION OF THE PREFERRED EMBODIMENT

For better understanding the background of the present invention, conventional arts will be first described with reference to FIGS. 8 and 9.

Figure 8:
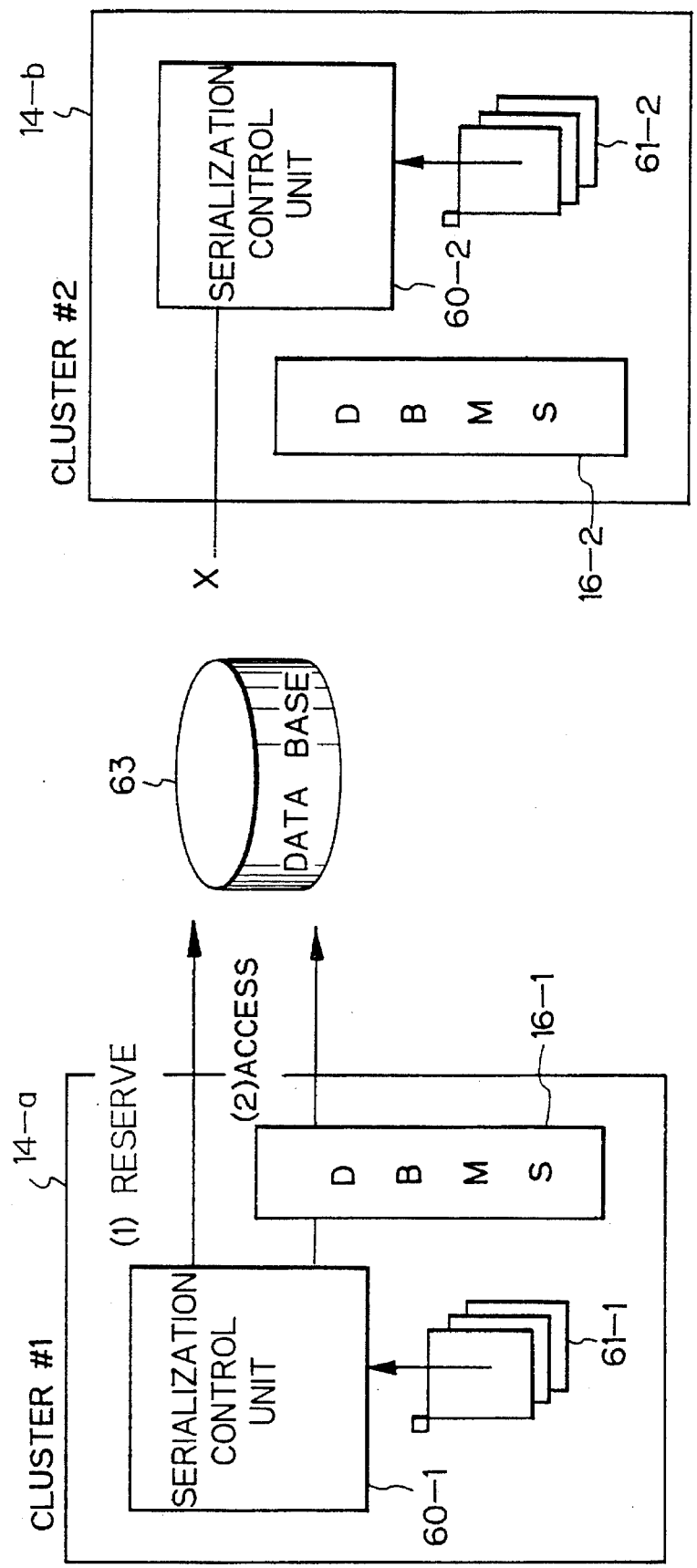
FIG. 8 is a diagram showing a conventional reserve-release system.

FIG. 8 is a diagram showing a conventional reserve-release system.

In FIG. 8, when a cluster 14-a has to, access a data base 63, a serialization unit 60-1 issues an instruction (1) to reserve a volume in the data base 63. After the reserve is established, a data base management subsystem (DBMS) 16-1 accesses the data base 63 (see (2) in the figure). Then, the data base is released from the cluster 14-a.

If a request to access the data base 63 is generated from a cluster 14-b while the volume in the data base 63 is reserved by the cluster 14-a, the reservation of the volume in the data base 63 is not allowed so that the access from the cluster 14-b to the data base 63 is inhibited.

In the above mentioned conventional reserve-release system, there is a problem as described before. Namely, a reserve and a release of resources are required each time an access is requested so that the serialization control has a large overhead. In addition, since the logical processing unit of the serialization control in the conventional reserve-release system is a volume, and the size of the volume is as large as, for example, several Gbytes, the unit of the serialization control is too large so that there is a tendency for a queue among the clusters to be easily adjusted.

Figure 9:
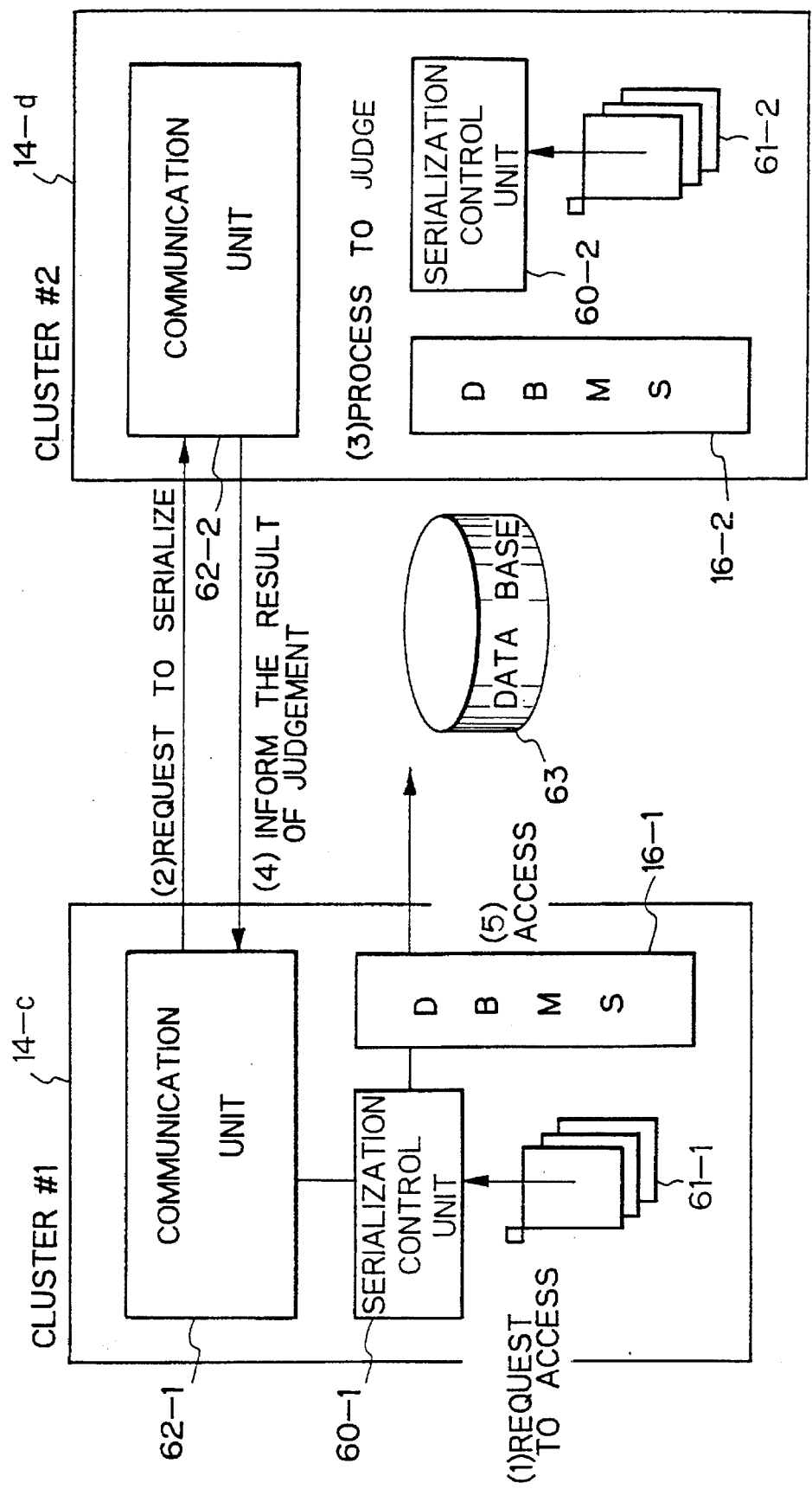
FIG. 9 is a diagram showing a conventional inter-cluster communication system.

FIG. 9 is a diagram showing a conventional inter-cluster communication system.

In FIG. 9, when an access request (1) is generated from an application processing unit 61-1 in a cluster 14-c, a serialization unit 60-1 informs another cluster 14-d of a request to serialize (2) by using communication units 62-1 and 62-2. A serialization unit 60-2 in the cluster 14-d judges, depending on whether or not the cluster 14-d is currently using the data base 63, whether or not the serialization is possible as shown by a reference (3). Then the result of the judgement is informed as shown by a reference (4) from the communication unit 62-2 through the communication unit 62-1 to the serialization unit 60-1. If the serialization is allowed, the serialization unit 60-1 informs the data base management subsystem (DBMS) 16-1 of the result so that the data base management subsystem 16-1 accesses the data base 63 as shown by a reference (5).

In the above-mentioned conventional inter-cluster communication system, there is a problem as described before. Namely, the communication overhead increases in proportion to the increase in the number of the clusters in the complex system. The communication overhead is the time necessary for the communication and the processing time required by a CPU in each cluster. In addition, the performance in processing a transaction cannot be greater than the performance of the communication channel.

The present invention has an object to provide a serialization control system in which the logical processing unit for serialization is smaller than a volume and the inter-cluster communication for sending a request for serialization and receiving an allowance for serialization is not necessary.

Figure 1:
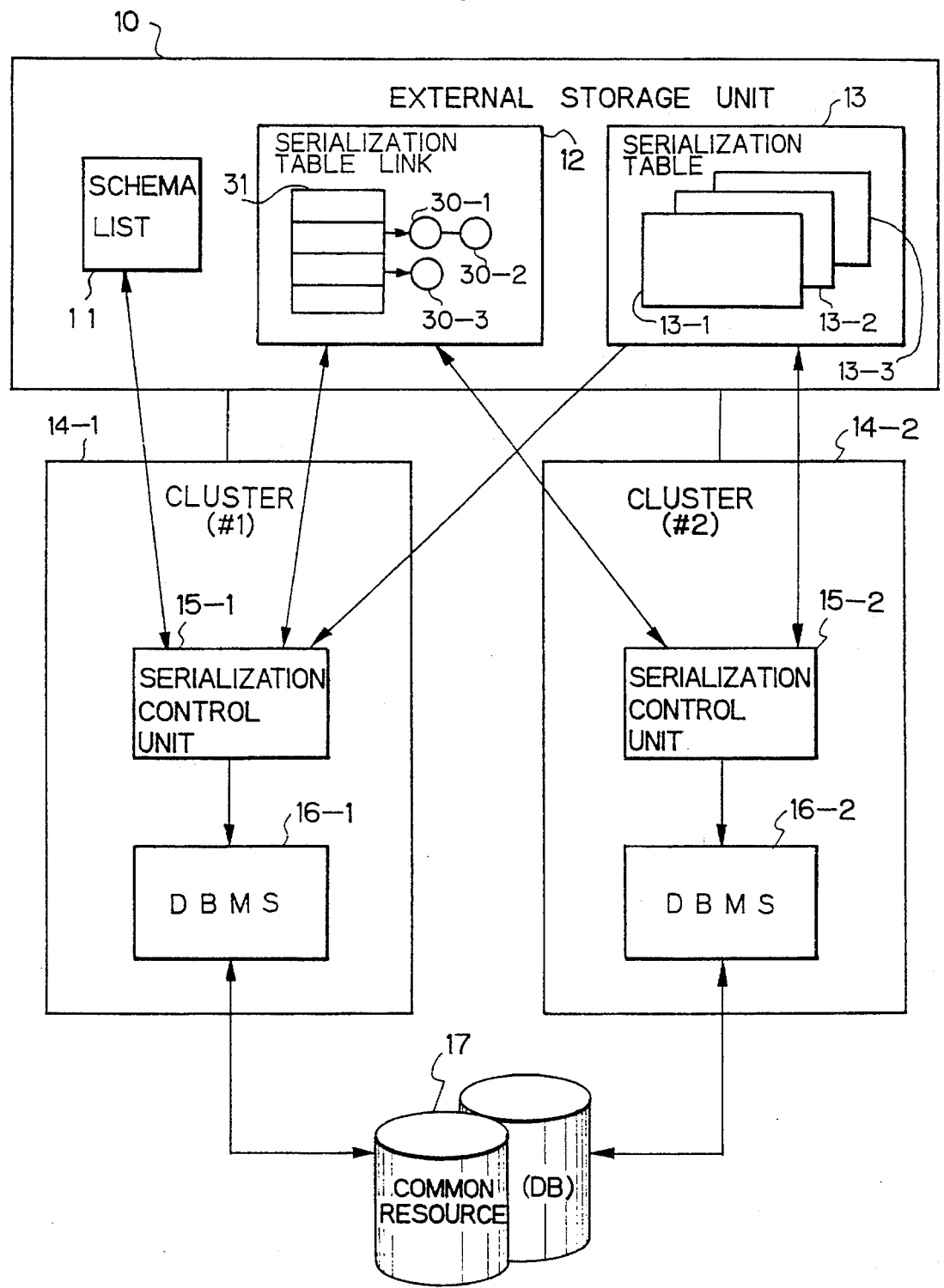
FIG. 1 is a block diagram showing inter-system serialization control system according to an embodiment of the present invention.

FIG. 1 is a block diagram showing an inter-system serialization control system according to an embodiment of the present invention. In the figure, reference numeral 10 is an external storage unit realized by, for example, a semiconductor memory which can be accessed at high speed in comparison with a direct access storage device (DASD), 11 is a schema list including schema information which defines the structure of resources such as data bases, 12 is a serialization table link information storing unit, 13 represents a serialization table having a plurality of entries, 14-1 and 14-2 are clusters each of which comprises a computer system having a central processing unit (CPU) and a main storage (not shown), 15-1 and 15-2 are serialization control units each for processing a serialization request for accessing resources such as data bases, 16-1 and 16-2 are data base management subsystems each for accessing resources, and 17 is shared resources such as data bases implemented by, for example, direct access storage devices (DASD) such as magnetic disk devices, commonly used by the clusters 14-1 and 14-2.

Although only two clusters and two resources are shown in FIG. 1 for the sake of simplicity of the drawing, there may be three or more clusters and a number of data bases.

In the embodiment, the shared resources 17 are data bases as an example, but instead of the data bases, a general data set such as files may also be employed. As is well known, the data base has a structure of logical processing units from blocks, sub-ranges, ranges, schemas, and volumes in order from the smaller unit to the larger unit. In the embodiment of the present invention, a block, which is the minimum logical processing unit, is employed as a logical processing unit of the resources for the serialization control, but instead of the block, another logical processing unit such as a sub-range, a range, or a schema, which is smaller than the volume, may also be employed as a logical processing unit. As is well known, a main storage (not shown in FIG. 1) in each of the clusters 14-1 and 14-2 stores the information of the structure of the data base in the form of blocks, sub-ranges, ranges, schemas, and volumes.

The external storage unit 10 can be accessed by each of the clusters 14-1 and 14-2. The clusters 14-1 and 14-2 constitute a complex system.

An empty entry in the serialization table 13 is made to correspond to a block when the block is required to be accessed. Each of the blocks is a logical processing unit for the inter-cluster serialization control. Each entry except for empty entries in the serialization table 13 stores serialization management information including an identifier of a block in the resource 17, an identifier of a transaction to be used for the serialization control, and a serialization level for serialization of the access to the corresponding block.

The serialization table link information storage unit 12 in the external storage unit 10 is a table for storing both address information of the entries of the serialization table 13 and resource identifying information for identifying a block. The capacity of the storage unit 12 is not greater than the total capacity of the serialization table 13.

The schema list 11 in the external storage unit 10 is a table for storing address information of the serialization table link information storage unit 12, the name of schemas, and the name of resources such as a data base, general data set, etc.

In operation, when a request for exclusively accessing a block in the resources 17 is generated from the cluster 14-1, the serialization control unit 15-1 generates the name of the resource, the name of the schema, and the name of the block. This can be done because the main storage stores the information of the structure of the resources 17. By using the name of the resource and the name of the schema as a key, the schema list 11 is searched to determine the address of the entry of the serialization table link information storage unit 12. By using the determined address, the serialization table link storage unit 12 is accessed by the cluster 14-1 to read the contents of the accessed entry. Then, based on the contents read from the Serialization table link storage unit 12, the serialization table 13 corresponding to the block in question is linked to a link table in the serialization table link storage unit 12. Thus, the entry in the serialization table 13 corresponding to the block in question is determined. The serialization control unit 15-1 reads the contents of the determined entry of the serialization table 13 corresponding to the block in question to carry out serialization control in accordance with the contents of the entry in the table 13.

Thus, according to the present invention, the serialization control can be carried out with a very small logical processing unit and without intercommunication among the clusters.

In more detail, when the serialization control unit 15-1 generates a request to exclusively access a block in the data bases 17, the serialization control unit 15-1 reads the contents of the schema List 11 and the contents of the serialization table link information storage unit 12 from the semiconductor external storage unit 10 and stores the contents into the main storage in the cluster 14-1. Then, the serialization control unit 15-1 determines, based on the read information in the main storage, whether or not there is another request to exclusively access the block in question. If there is another request to exclusively access the block in question, the serialization control unit 15-1 carries out the processes serially in accordance with the serialization levels in the serialization table 13, the contents of which are stored in the main storage.

The serialization table link information storage unit 12 is pointed to by the schema list 11. Whether or not there is an entry in the serialization table 13 corresponding to the requested block for serialization is determined by the serialization table links information storage unit 12. Therefore, it is not necessary to search all of the serialization table 13 so that a serialization process can be carried out a small number of times to access the semiconductor external storage unit 10.

When the serialization request from the serialization control unit 15-1 is accepted, namely when the request for exclusively accessing a block is accepted because there is no conflict, the serialization control unit 15-1 sets necessary data in an empty entry of the serialization table 13 and points to it from the serialization table link information storage unit 12 to inform the data base management subsystem 16-1 of the establishment of the serialization. Then the data base management subsystem 16-1 accesses the requested block in the shared resources 17.

Thus, according to the present invention, the inter-cluster serialization information is stored in the serialization table link information storage unit 10 and in the serialization table 13, and the unit 12 and the table 13 are provided in the semiconductor external storage unit 10. By exclusively referring to or updating the inter-cluster serialization information, each cluster can exclusively control a block in the shared resources 17.

In particular, to reduce the number of access times to the semiconductor external storage unit 10, the information necessary to serialize the reading process and the writing process is stored in the serialization table 13, and the pointer information for pointing to one of the entries in the serialization table 13 is stored in the serialization table link information storage unit 12. The memory size of the serialization table link information storage unit 12 is made to be smaller than the memory size of the serialization table 13. Accordingly, whether or not the corresponding entry of the serialization table 13 is being exclusively used, namely, whether or not the corresponding transaction is being occupied, can be determined with, for example, only one access of the semiconductor external storage unit 10 to read the serialization table link information storage unit 12. When it is found that the corresponding entry of the serialization table 13 is not being occupied, the corresponding entry of the serialization table 13 can be accessed immediately.

Figure 2:
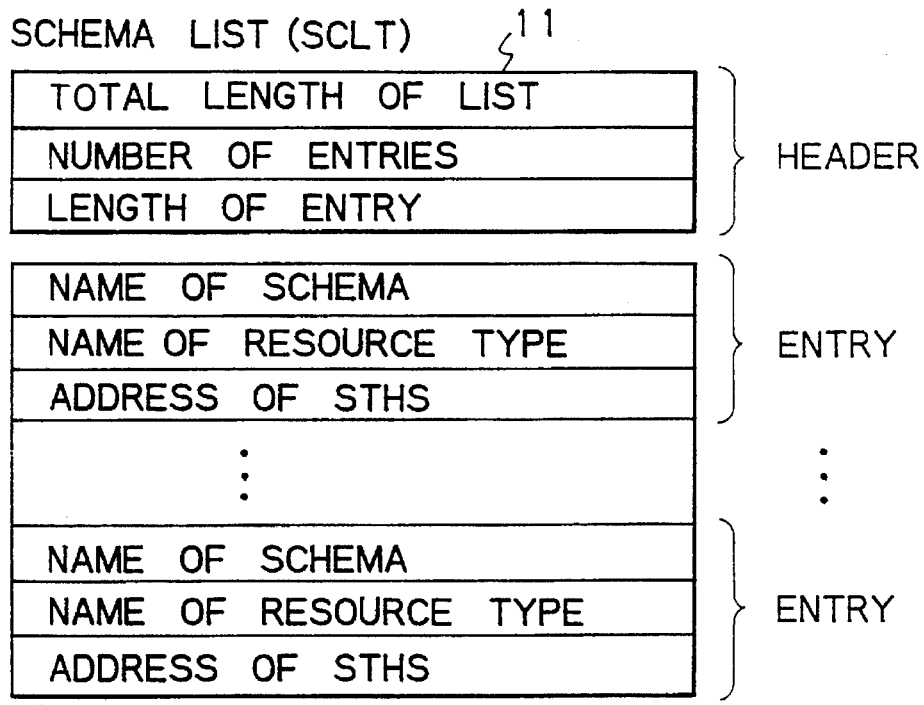
FIG. 2 is a diagram showing the contents of a schema list used in the system shown in FIG. 1.
Figure 3:
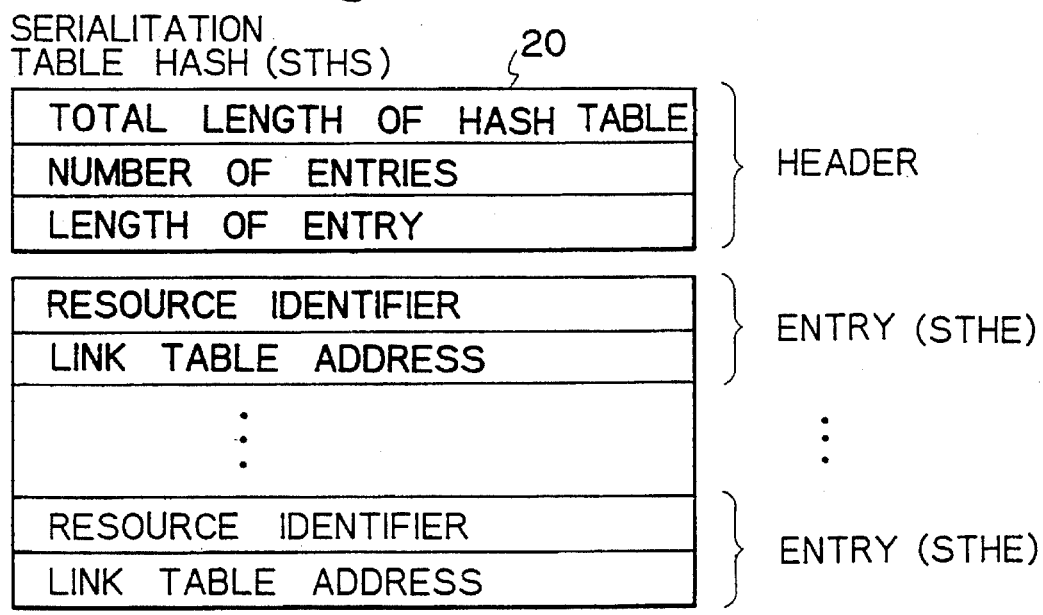
FIG. 3 is a diagram showing the contents of a serialization table hash used in the system shown in FIG. 1.

FIG. 2 is a diagram showing the contents of the schema list 11 used in the system shown in FIG. 1. As shown in FIG. 2, the schema list consists of a header and entries corresponding to respective schemas. In the header, the total length of the list, the number of entries, and the length of each entry are set. In each entry, the name of a schema, the name of a resource type, and the address of an entry of a serialization table hash 20 (see FIG. 3) are described. The name of a resource is, for example, an identifier of, for example, a general data set, a relational data base, or a network data base. The contents of the serialization table hash 20 are shown in FIG. 3. The schema lift 11 is used to identify one of the entries of the serialization table hash 20 corresponding to the resource type which includes the requested block to be exclusively processed.

Figure 4:
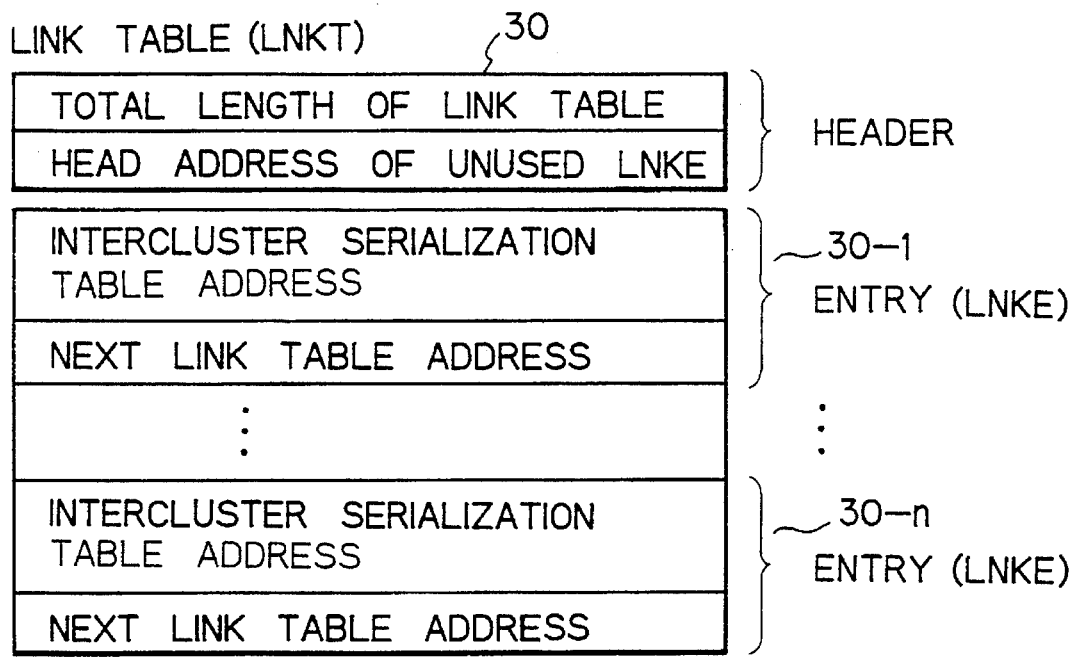
FIG. 4 is a diagram showing the contents of a link table used in the system shown in FIG. 1.

The serialization table link information storage unit 12 used in the system shown in FIG. 1 includes the serialization table hash 20 shown in FIG. 3 and a link table (LNKT) 30 shown in FIG. 4.

As shown in FIG. 3, the serialization table hash 20 consists of a header and a plurality of entries. In the header, the total length of the list, the number of entries, and the length of each entry are set. Each entry includes a resource identifier for identifying a logical processing unit of the resources such as a block, and a link table address for accessing an entry of the link table 30. Instead of the block, the logical processing unit may be a sub-range, range, or schema, which is smaller than a volume.

As shown in FIG. 4, the link table 30 includes a header and a plurality of entries 30-1 to 30-n. The header includes the total length of the link table 30 and a head address of an unused entry in the link table 30. Each entry includes an address of an entry of the inter-cluster serialization table 13 shown in FIG. 5 and the address of the next entry of the link table 30. The link table entries 30-i extracted from the link table 30 are shown in FIG. 1 by small circles. By using the address of the next entry of the link table 30, each entry can be queued.

Figure 5:
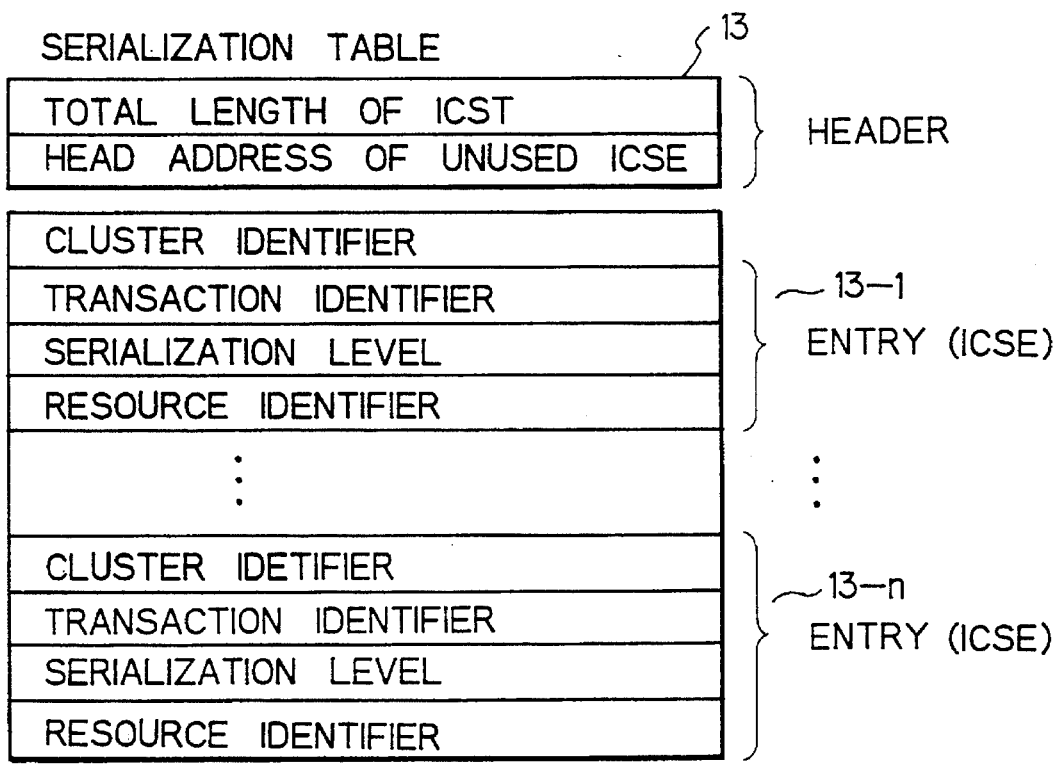
FIG. 5 is a diagram showing the contents of an inter-cluster serialization table used in the system shown in FIG. 1.

As shown in FIG. 5, the serialization table 13 consists of a header and a plurality of entries 13-1 to 13-n. The header includes the total length of the table and a head address of an unused entry in the inter-cluster serialization table 31. Each entry in the serialization table 13 is used as a message board. Namely, in each entry except for an empty entry, the following data are set, i.e., a cluster identifier for identifying a cluster from which the transaction is generated, a transaction identifier for identifying the transaction, a serialization level such as a so-called S mode (commonly used mode), X mode (exclusively used mode), and so forth, and a resource identifier for identifying a logical processing unit of the resources such as a block.

The relation among these tables described above is as shown in FIG. 6.

Figure 6:
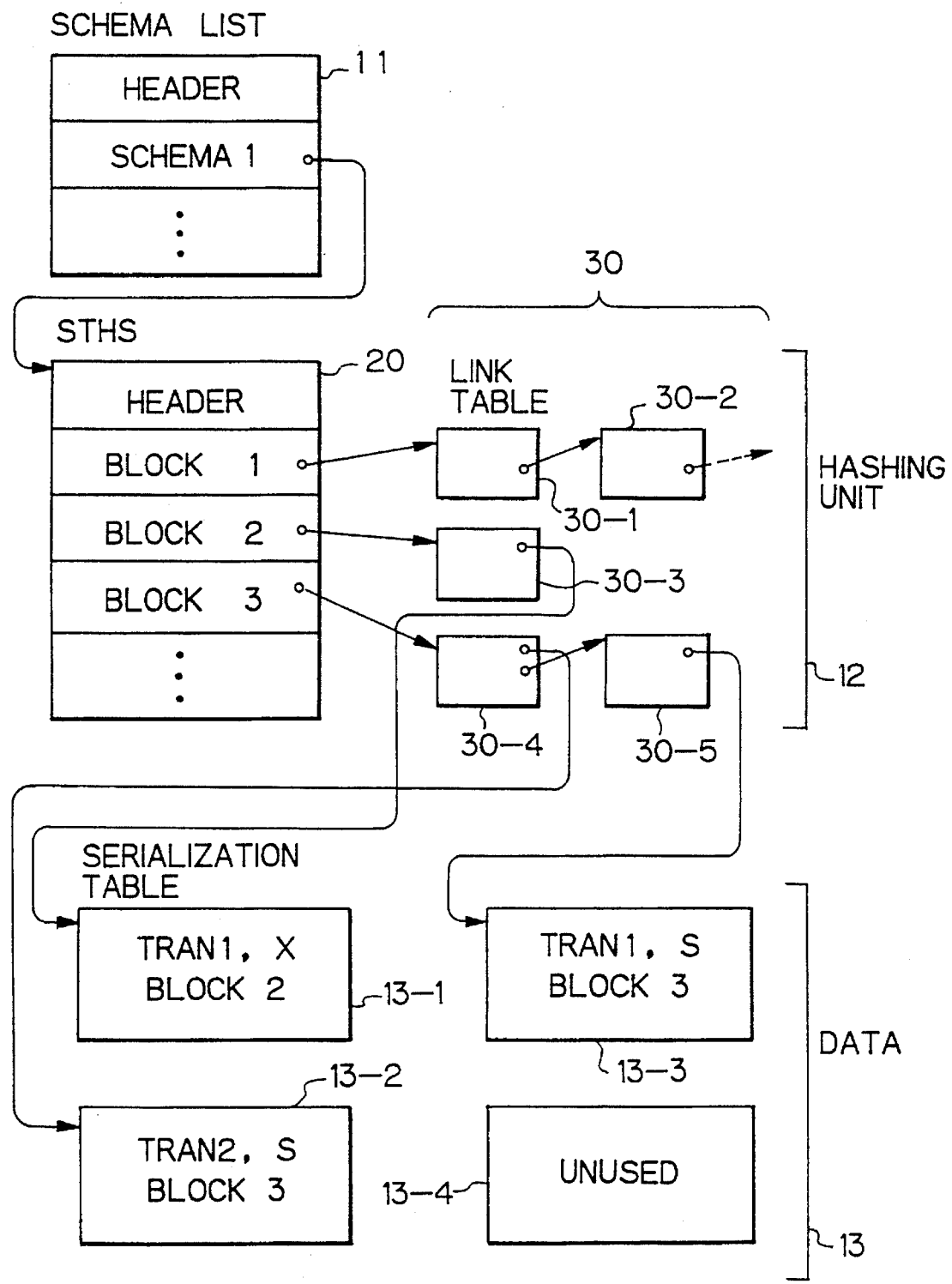
FIG. 6 is a diagram showing the relation among tables used in the system shown in FIG. 1.

In FIG. 6, the tables relating to the serialization control consist of the serialization table link information storage unit 12, which is a hashing part, and the inter-cluster serialization table 13, which is a data part. The hasing part 12 includes the serialization table hash 20 and the link table 30 including entries 30-1 to 30-5 as an example. The data part 13 includes the entries 13-1, 13-2, 13-3, and 13-4 as an example of the serialization table 13. Each of the entries 13-1, 13-2, and 13-3 is made to correspond to one of the entries of the serialization table hash 20 through one or more link table entries 30-1, 30-2, . . . The entry 13-4 of the serialization table 13 is unused so that no data is set in the entry 13-4 and it is not linked to any entry in the serialization hash table 20.

In the illustrated example, a shared resource BLOCK 2 is being exclusively used by a transaction TRN1. In this case, a pointer is provided to point from the corresponding entry in the serialization table hash 20 to the entry 30-3 of the link table 30, and the entry 13-1 of the serialization table 13 points from the entry 30-3 of the link table 30. In the entry 13-1 of the serialization table 13, there are set the transaction identifier of the transaction TRN1 which has generated the request to exclusively occupy the shared resource BLOCK 2, the serialization level X, and the resource identifier. Referring to this information in the entry 13-1, transactions can be carried out serially among clusters.

Since the serialization table link information storage unit 12 is divided into the serialization table hash 20 and the link table 30, and since each entry of the link table 30 is managed by queuing, the memory capacity may be small even when a plurality of entries in the serialization table 13 are made to correspond to one entry in the serialization table hash 20.

The size of the hashing unit 12 including the serialization table hash 20 corresponding to one schema and the entries 30-1, 30-2, . . . of the link table 30 is made to be the size readable by one access of the semiconductor external storage unit 10. In addition, the size of the inter-cluster serialization table 13 including one header and one entry is made to be the same as the accessing unit of the semiconductor external storage unit 10. By this construction, the number of accessing times to the semiconductor external storage unit 10 can be minimized.

Figure 7:
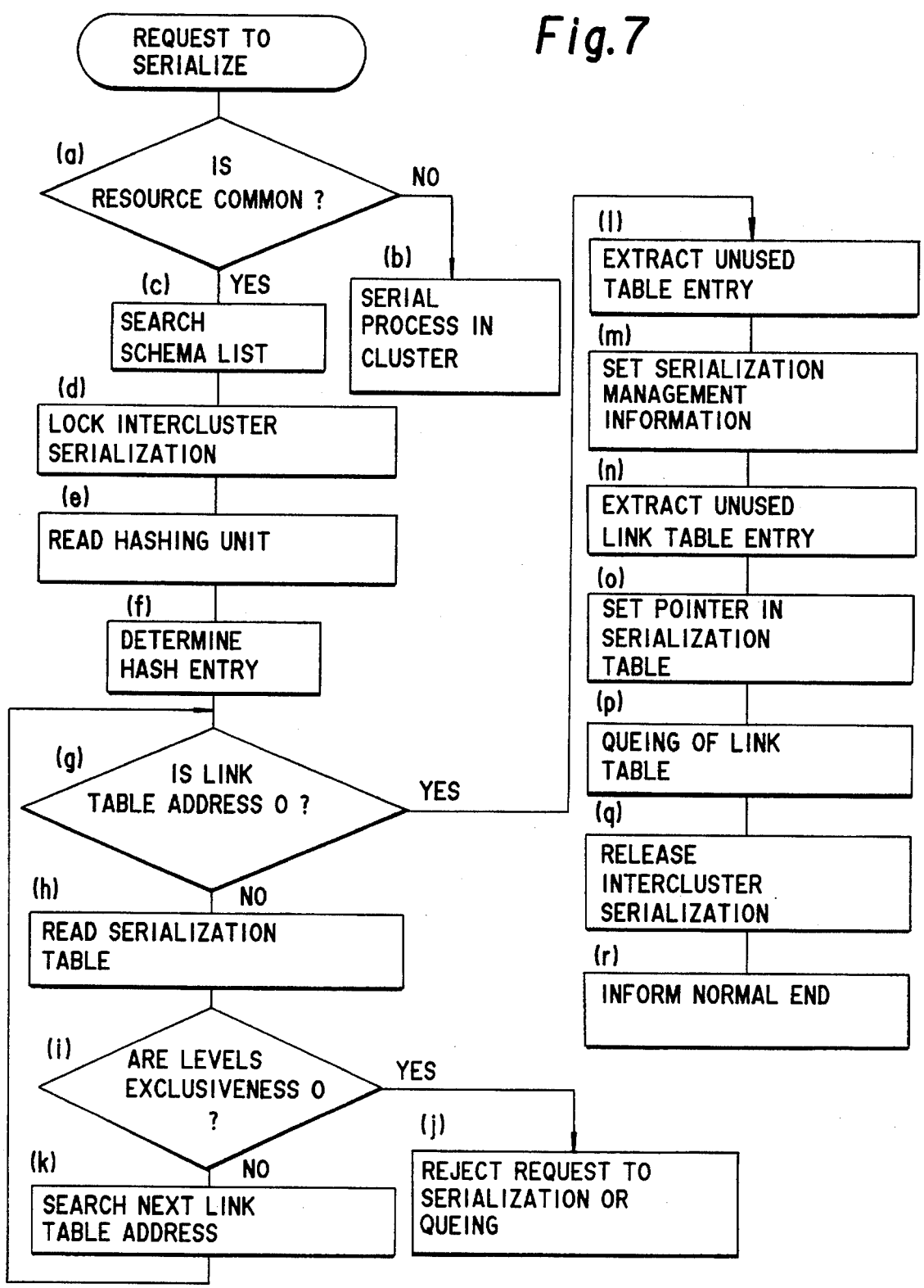
FIG. 7 is a flowchart explaining the Operation of the serialization control unit in the system shown in FIG. 1.

FIG. 7 is a flowchart explaining the operation of the serialization control unit 15-1 in FIG. 1, according to an embodiment of the present invention.

In FIG. 7, when an application program in the cluster 14-1, for example, issues an instruction to access, for referring to or updating, a block in the data base 17 common to the clusters, the data base management subsystem (DBMS) 16-1 generates a request to the serialization control unit 15-1 to perform a serialization process At step (a), the serialization control unit 15-1 judges whether or not the block requested to be exclusively processed is a shared resource among the clusters 14-1 and 14-2.

At step (b), when the block to be exclusively processed is not the shared resource, the transaction is serially processed within the cluster 14-1. The serialization process within one cluster is the same as the conventional serialization process, and therefore, a detailed description thereof is omitted At step (c), when the block to be serially processed is a shared resource, the serialization control unit 15-1 searches the schema list 11 using, as a key, the name of the schema and the name of the type of the resource which are provided by the data base management subsystem 16-1, to determine the address of an entry in the serialization table hash (STHS) 20. In the embodiment illustrated in FIG. 1, the schema list 11 is provided in the semiconductor external storage unit 10. To enable a higher-speed search, however, the schema list may be previously read into a main storage in the cluster 14-1.

At step (d), to avoid a conflict in referring to or updating the serialization control tables serialization table link information storage unit 12 and serialization table 13), an inter-cluster serialization lock is established among the clusters 14-1 and 14-2. The inter-cluster serialization lock can be established by an instruction such as a well known compare and swap instruction.

At step (e), once the inter-cluster serialization lock is established, the contents of the serialization table link information storage unit 12 are read into the main storage in the cluster 14-1.

At step (f), by using the resource identifier for identifying the block as a key, a predetermined hash function is applied to the serialization table hash 20 or the serialization table hash 20 is searched, to determine the address of the entry of the serialization table hash 20 relating to the block to be exclusively used.

At step (g), after the determination of the serialization table hash entry, it is judged whether or not the link table address in the determined entry is 0. If the link table address is 0, this means that a serialization request has not been issued to this block in question, so that the process goes to step (1) for setting necessary data in an unused entry oil the serialization table 13.

If the link table address is not 0, this means that the block in question is being used by another cluster. Then, at step (h), an entry in the link table 30 is accessed by using the link table address so as to read the entry of the serialization table 13 pointed to by the accessed entry of the link table 30 and store the read contents from the semiconductor external storage unit 10 to the main storage.

At step (i), it is determined whether or not the serialization level set in the already read entry of the serialization table 13 is exclusive to the serialization level relating to the current serialization request. This serialization check by using the serialization levels is well known. Therefore, a more detailed description of the serialization check is omitted here. If the serialization level is not exclusive, this means that another cluster is using the block in a mode other than an exclusive mode. Therefore, the process goes to step (k) to read the next link table address and then returns to step (g).

In the serialization check at step (i), if the serialization level is determined to be exclusive, then at step (j), the current request for serialization is rejected and the failure to access is informed to the point of origin of the request. Alternatively, a queuing control is carried out to keep the request for serialization waiting until the previous serialization is released. For the queuing control, the link table is utilized as an example.

At step (g), if the link table address is 0, then at step (1), the header of the serialization table 13 (see FIG. 5) is read to extract an unused entry of the serialization table 13 for setting necessary data to be used as a message board At step (m), in the unused entry of the serialization table 13 extracted at step (1), serialization management information such as a cluster identifier, a transaction identifier, a serialization level, a resource identifier for identifying a block in this embodiment, and so forth are set.

At step (n), an unused entry in the link table 30 is extracted by referring to the header of the link table 30.

At step (o), from the extracted entry of the link table 30, the entry in the serialization table 13 in which the serialization management information is set at step (m) is pointed to.

At step (p), the pointed to link table 30 is queued after the last entry of the link table 30 which is queued from the entry of the corresponding serialization table hash 20.

At step (q), when the steps (1) to (p) are carried out on the main storage, the updated contents are written in the semiconductor external storage unit 10, and the inter-cluster serialization lock in the serialization control table in the semiconductor external storage unit 10 is released.

At step (r), a normal end of the serialization process is informed to the data base management subsystem 16-1.

As described above, according to the present invention, an inter-cluster serialization process can be performed with an overhead which is not influenced by the number of clusters constituting a complex system, when compared with the conventional inter-cluster serialization system by the reserve-release system of hardware or the conventional serialization control system by inter-cluster communication.

In particular, according to the present invention, the unit of the inter-cluster serialization is not so large as a volume in the data base but is as small as a block corresponding to the storing structure of the data base so that the queuing time for serialization can be shortened. In addition, in the present invention, the control tables for serialization control, provided in the semiconductor external storage unit, are separated into the serialization tables link information storage unit and the serialization tables in which the actual serialization management information is set, so that the number of accessing times to the semiconductor external storage unit can be reduced, resulting in a high speed serialization process.

Accordingly, in the present invention, even for work in which accesses are concentrated on particular data, the response does not become extremely low but the complex system can be effectively used by dispersing the load.

We claim:

1. An inter-system serialization control system for serially allowing access to shared resources among a plurality of computer systems, comprising:

an external storage unit commonly connected to said computer systems, for storing, when a request for accessing a logical processing unit in said shared resources is generated from one of said computer systems, serialization management information corresponding to said logical processing unit, said logical processing unit being smaller than a volume of said shared resources; and a serialization control unit provided in each of said computer systems and operatively connected to said external storage unit, for reading, in response to said request for accessing a logical processing unit of said shared resources, the corresponding logical processing unit in said serialization management information from said external storage unit and for accessing the corresponding logical processing unit in said shared resources under a serialization control based on the read serialization management information, wherein said external storage unit stores:

a serialization table having a plurality of entries, said serialization information of a logical processing unit being stored in an empty entry of said plurality of entries when said request for accessing said logical processing unit in said shared resources is generated from one of said computer systems; and a serialization table link information storage unit for storing address information of the entries in said serialization tables and identification information for identifying logical processing units in said shared resources, the capacity of said serialization table link information storage unit being smaller than the capacity of said serialization tables;

wherein said serialization control unit searches, in response to a request for exclusively accessing a logical processing unit in said shared resources, the entry of said serialization table in which said serialization information of said logical processing unit is stored, and judges whether or not the request for serially processing the logical processing unit conflicts with another serialization request, and when it is determined that the request for serially processing the logical processing unit does not conflict with another serialization request, the corresponding logical processing unit in said shared resources is accessed in accordance with the contents in the searched entry of said serialization table;

wherein said serialization table link information storage unit stores a link table and a serialization table hash, said link table having a plurality of entries each for storing an address of an entry in said serialization table, and said serialization table hash having a plurality of entries each for storing an identification of a logical processing unit and an address of an entry in said link table.

2. An inter-system serialization control systems as claimed in claim 1, wherein each entry in said serialization table stores an identifier of one of said computer system, an identifier of a transaction, a serialization level, and an identifier of a logical processing unit.

3. An inter-system serialization control system as claimed in claim 2, wherein said external storage unit further stores a schema list having a plurality of entries each for storing the name of a schema, the names of said shared resources, and the address of an entry of said serialization table hash.

4. An inter-system serialization control system for serially allowing access to shared resources from a plurality of computer systems, comprising:

an external storage unit commonly connected to said computer systems, for storing serialization management information corresponding to a plurality of logical processing units, which are contained in said shared resources, and each of which can be accessed by said plurality of computer systems;

a serialization control unit provided in each of said computer systems and operatively connected to said external storage unit, for reading said serialization management information and for accessing the corresponding logical processing unit in said shared resources under a serialization control based on the read serialization management information, said external storage unit storing a serialization table, a link table and a serialization table hash, said serialization table having a plurality of entries each for storing serialization information for a respective logical processing unit, said link table having a plurality of entries each for storing an address of an entry in said serialization table, and said serialization table hash having a plurality of entries each for storing an identification of a logical processing unit and an address of an entry in said link table, wherein said serialization control unit searches said serialization table for an entry which stores serialization information corresponding to one of the plurality of logical processing units which is accessed, in response to a request for an exclusive access to said one of the plurality of logical processing units in said shared resources, judges whether or not said exclusive access request to said one of the plurality of logical processing units conflicts with another exclusive access request, and accesses said one of the plurality of logical processing units in said shared resources in accordance with the serialization information in the searched entry of said serialization table.

5. An inter-system serialization control system as claimed in claim 4, wherein said logical process unit is a block in said shared resources.

6. An inter-system serialization control system as claimed in claim 4, wherein said logical processing unit is a sub-range in said shared resources.

7. An inter-system serialization control system as claimed in claim 4, wherein said logical processing unit is a range in said shared resources.

8. An inter-system serialization control system as claimed in claim 4, wherein said logical processing unit is a schema in said shared resources.

9. An inter-system serialization control system as claimed in claim 4, wherein said external storage unit is a semiconductor memory.

10. An inter-system serialization control system as claimed in claim 4, wherein said shared resources are data bases stored in direct access storage devices.

11. An inter-system serialization control system as claimed in claim 4, wherein said shared resources are general data sets stored in direct access storage devices.

12. An inter-system serialization control system as claimed in claim 4, wherein said computer systems are connected via a communication bus for effecting a lock among clusters and for releasing the lock when a serialization process is effected.

* * * * *